United States Patent
Sloan

(10) Patent No.: US 10,598,756 B2
(45) Date of Patent: Mar. 24, 2020

(54) SYSTEM AND METHOD FOR DETERMINING THE SOURCE LOCATION OF A FIREARM DISCHARGE

(71) Applicant: Mesa Engineering, Inc., Houston, TX (US)

(72) Inventor: David Gregory Sloan, Houston, TX (US)

(73) Assignee: Mesa Engineering, Inc., Houston, TX (US)

(*) Notice: Subject to any disclaimer, the term of this patent is extended or adjusted under 35 U.S.C. 154(b) by 287 days.

(21) Appl. No.: 15/827,769

(22) Filed: Nov. 30, 2017

(65) Prior Publication Data

US 2019/0162812 A1    May 30, 2019

(51) Int. Cl.
- *G01S 3/808* (2006.01)
- *G08B 17/08* (2006.01)
- *G08B 13/16* (2006.01)

(52) U.S. Cl.
CPC ........ *G01S 3/8083* (2013.01); *G08B 13/1672* (2013.01); *G08B 17/08* (2013.01)

(58) Field of Classification Search
CPC .... G01S 3/8083; G08B 13/1672; G08B 17/08
See application file for complete search history.

(56) References Cited

U.S. PATENT DOCUMENTS

| | | | |
|---|---|---|---|
| 5,504,717 A | 4/1996 | Sharkey et al. | |
| 5,973,998 A | 10/1999 | Showen et al. | |
| 8,050,141 B1 | 11/2011 | Carroll et al. | |
| 8,325,563 B2 | 12/2012 | Calhoun et al. | |
| 8,817,577 B2 | 8/2014 | Azimi-Sadjadi et al. | |
| 9,348,010 B1 | 5/2016 | Showen | |
| 2004/0133535 A1 | 7/2004 | Scharler et al. | |
| 2010/0226210 A1 | 9/2010 | Kordis et al. | |
| 2016/0133107 A1 | 5/2016 | Showen et al. | |
| 2016/0209390 A1 | 7/2016 | Overcast | |

(Continued)

OTHER PUBLICATIONS

J.C. Lahr and F.G. Fischer. Location of Acoustic Sources Using Seismological Techniques and Software; U.S. Department of the Interior, Open-File Report 93-221, Menlo Park, California 1993.

(Continued)

*Primary Examiner* — Daniel Pihulic
(74) *Attorney, Agent, or Firm* — Blank Rome LLP

(57) ABSTRACT

A system for determining a source location of a firearm discharge includes a plurality of monitoring stations and a central processing system. Each of the monitoring stations determines a time value of identification of a firearm discharge signature and transmits the time value. The central processing system 1) receives the time value from each of the monitoring stations; 2) determines, based on the time values, a geographic area that includes the source location of the firearm discharge; 3) determines a time of acoustic propagation from each of a plurality of randomly selected locations within the geographic area to each of the monitoring stations; 4) identifies the source location of the firearm discharge as the selected location for which difference in the time of acoustic propagation to each of the monitoring stations is closest to difference in the time values received from each of the monitoring stations.

20 Claims, 5 Drawing Sheets

(56) References Cited

U.S. PATENT DOCUMENTS

2019/0162812 A1* 5/2019 Sloan .................. G08B 17/08

OTHER PUBLICATIONS

Robert C. Maher and Steven R. Shaw. Deciphering Gunshot Recordings; AFS 33rd International Conference, Denver, CO. Jun. 5-7, 2008.

Juan R. Aguilar. Gunshot Location Systems; Security Technology (CCST), 2013 47th International Carnahan Conference on Security Technology.

Alfonso Chacon-Rodriguez et al. Evaluation of Gunshot Detection Algorithms. IEEE Transactions on Circuits and Systems—I: Regular Papers, vol. 58, No. 2. Feb. 2011.

Sergei Astapov et al. Gunshot Acoustic Component Localization with Distributed Circular Microphone Arrays, 2015 IEEE International Conference on Digital Signal Processing (DSP). Jul. 2015.

* cited by examiner

SYSTEM AND METHOD FOR DETERMINING THE SOURCE LOCATION OF A FIREARM DISCHARGE

BACKGROUND

In both rural and urban environments, gunfire presents a hazard to persons and property. Various sensing systems have been developed to identify and alert authorities to the presence gunfire. The goal of such systems is to detect the presence of gunfire and alert authorities in a timeframe that improves the odds of apprehending the responsible party, rendering aid as needed, and/or providing other appropriate response.

SUMMARY

A system and method for determining a source location of a firearm discharge in an environment that includes a high concentration of acoustic reflectors and obstructions, such as an urban environment is disclosed herein. In one embodiment, a system for determining a source location of a firearm discharge includes a plurality of monitoring stations and a central processing system. Each of the monitoring stations includes a plurality of acoustic sensors, processing circuitry, timing circuitry, and communication circuitry. The processing circuitry is coupled to the acoustic sensors. The processing circuitry is configured to monitor output signal of the acoustic sensors, and to identify in the output signal of each of the acoustic signals a signature indicative of a firearm discharge. The timing circuitry is configured to generate a clock signal that is synchronized to an external timing reference, and to apply the clock signal to determine a time value of identification of the signature indicative of the firearm discharge for each of the acoustic sensors. The communication circuitry is configured to transmit the time value for each of the acoustic sensors. The central processing system is communicatively coupled to the monitoring stations. The central processing system includes communication circuitry and processing circuitry. The communication circuitry is configured to receive the time value for each of the acoustic sensors of each of the monitoring stations. The processing circuitry is configured to determine, based on the time value of each of the acoustic sensors of the monitoring stations, a geographic area that includes the source location of the firearm discharge. The processing circuitry is also configured to determine a time of acoustic propagation from each of a plurality of randomly selected locations within the geographic area to each of the monitoring stations. The processing circuitry is further configured to identify the source location of the firearm discharge as one of the selected locations within the geographic area for which a difference in time of acoustic propagation to each of the monitoring stations is closest to a difference of the time values received from the monitoring stations.

In another embodiment, a method for determining a source location of a firearm discharge includes identifying, by each of a plurality of remote monitoring stations, a signature indicative of the firearm discharge in an output signal of each of a plurality of acoustic sensors. Each of the plurality of remote monitoring stations determines a time value of a reference timing system at which identification of the signature indicative of the firearm discharge occurred for each of the acoustic sensors. Each of the plurality of remote monitoring stations communicates the time values to a central processor. The central processor determines, based on the time value of each of the acoustic sensors of the monitoring stations, a geographic area that includes the source location of the firearm discharge. The central processor determines a time of acoustic propagation from each of a plurality of randomly selected locations within the geographic area to each of the monitoring stations. The central processor determines, for each of the monitoring stations and each of the randomly selected locations, the time of acoustic propagation from the selected location to the monitoring station to at least one of the time values received for one of the acoustic sensors of the monitoring station. The central processor identifies the source location of the firearm discharge as one of the selected locations within the geographic area for which a difference in the time of acoustic propagation to each of the monitoring stations is closest to a difference in the time values received from the monitoring stations.

In a further embodiment, a processing system for determining a source location of a firearm discharge includes communication circuitry and processing circuitry. The communication circuitry is configured to communicate with a plurality of monitoring stations, where each of the monitoring stations comprises a plurality of acoustic sensors, and to receive a time value for each of the acoustic sensors of each of the monitoring stations. The time value represents a time at which a firearm discharge is detected via the acoustic sensor. The processing circuitry is configured to determine, for each of the monitoring stations, based on the time value of each of the acoustic sensors of the monitoring station, a direction from the monitoring station to a potential source location of the firearm discharge. The processing circuitry is also configured to determine a geographic area that includes the source location of the firearm discharge based on the direction from the monitoring station to the potential source location of the firearm discharge. The processing circuitry is further configured to determine a time of acoustic propagation from each of a plurality of randomly selected locations within the geographic area to each of the monitoring stations. The processing circuitry is yet further configured to determine for each of the selected locations a composite difference value between the time values received from each of the monitoring stations and the time of acoustic propagation to each of the monitoring stations. The processing circuitry is additionally configured to identify the source location of the firearm discharge as a smallest of the composite difference values.

BRIEF DESCRIPTION OF THE DRAWINGS

For a detailed description of various examples, reference will now be made to the accompanying drawings in which.

DETAILED DESCRIPTION

Figure 1:
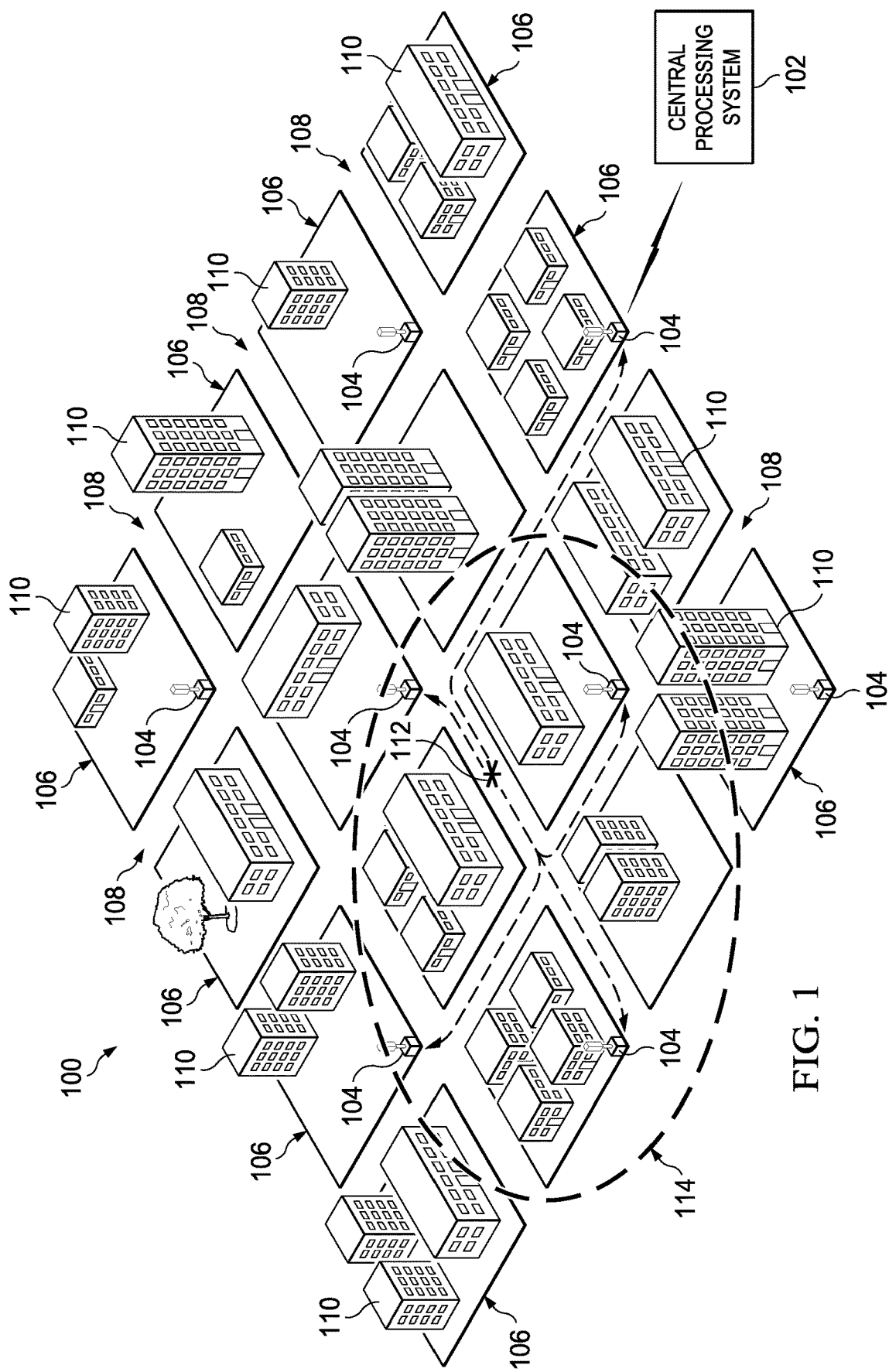
FIG. 1 illustrates use of a firearm discharge source location system in an urban environment in accordance with various embodiments.

Certain terms are used throughout the following description and claims to refer to particular system components. As one skilled in the art will appreciate, different parties may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of additional factors.

While various techniques for determining the location of a firearm discharge are known and/or available, such techniques are subject to a variety of shortcomings. For example, in an environment that includes a large number of acoustic reflectors and obstructions (e.g., an urban environment), the source location of a firearm discharge can be difficult to determine using conventional techniques, such as triangulation. A firearm discharge produces an acoustic impulse that propagates omni-directionally while various surfaces and objects present in the urban environment cause the acoustic energy to be diffracted, reflected, refracted, and/or attenuated. Accordingly, acoustic energy produced by the firearm discharge may arrive at an acoustic transducer disposed in the urban environment from a direction and/or at time that is not directly indicative of the location of the firearm discharge. In such cases, conventional systems may be unable to accurately determine the source location of the firearm discharge.

Embodiments of the present disclosure enable accurate determination of firearm discharge source location in an urban environment. Embodiments of the system for determining the source location of a firearm discharge disclosed herein include a plurality of monitoring stations disposed at known locations about the urban environment and a central processing system communicatively coupled to the monitoring stations. Each monitoring station includes a plurality of microphones, where the relative location of each microphone is known. Data acquisition circuitry associated with the microphones is time synchronized to an external timing reference to allow the time at which each microphone detects a given acoustic impulse to be accurately determined.

The central processing system receives detection time information from the monitoring stations (for example: time of acoustic detection for each microphone of each monitoring station and location of each microphone at the time of detection), and based on the relative detection times, determines an angle from the monitoring station to the firearm discharge source location. Given the angles to the firearm discharge source location associated with multiple monitoring stations, the central processing system identifies a general area of origination of the firearm discharge.

The central processing system refines the location of the firearm discharge source location by simulating a plurality of acoustic impulses in an environmental model that represents the monitoring stations and the objects (e.g., buildings, streets, and other structures) in the environment. In one embodiment, the central processing system applies a Monte Carlo simulation to randomly select a location in the general area of origination of the firearm discharge, initiate an acoustic impulse at the selected location in the environmental model, simulate propagation of acoustic energy to the monitoring stations in the environmental model, and measure the propagation time of the acoustic impulse to one or more microphones of the monitoring stations. The central processing system may perform any number of such simulations (e.g., thousands, tens of thousands, hundreds of thousands, etc.), and compare the propagation times produced by each simulation to the detection time information received from the monitoring stations. The source location of the firearm discharge corresponds to the simulation having a randomly selected impulse source location that produces propagation times most closely matching the detection time information received from the monitoring stations.

FIG. 1 illustrates use of a firearm discharge source location system in an urban environment in accordance with various embodiments. FIG. 1 shows an urban environment 100 that includes a number of city blocks 106 and interconnecting streets 108. Structures (e.g., buildings) 110 of various sizes and shapes are disposed on each of the city blocks 106. The structures 110 and other objects in the environment 100 produce diffraction, reflection, refraction, and/or attenuation of the acoustic signals propagating through the environment 100.

The environment 100 also includes a number of monitoring stations 104. Any number of the monitoring stations 104 may be provided in the environment 100. For example, a monitoring station 104 may be incorporated in traffic control systems (such as traffic light control equipment or red light violation monitoring systems) typically provided at each street intersection. The monitoring stations 104 receive acoustic signals present in the environment and identify firearm discharge in the acoustic signals. Timing circuitry in each of the monitoring stations is synchronized to an external timing reference. The timing circuitry provides a time value corresponding to the time that a firearm discharge is identified. Because the paths over which the acoustic signals can propagate in the environment 100 are limited by the structures 110, the time at which a firearm discharge is identified may not represent time of point-to-point propagation between the location of firearm discharge and the monitoring station 104. FIG. 1 shows routes of acoustic energy propagation from a firearm discharge location 112 to various monitoring stations 104. The monitoring stations 104 transmit discharge identification time values to a central processing system 102.

Figure 2:
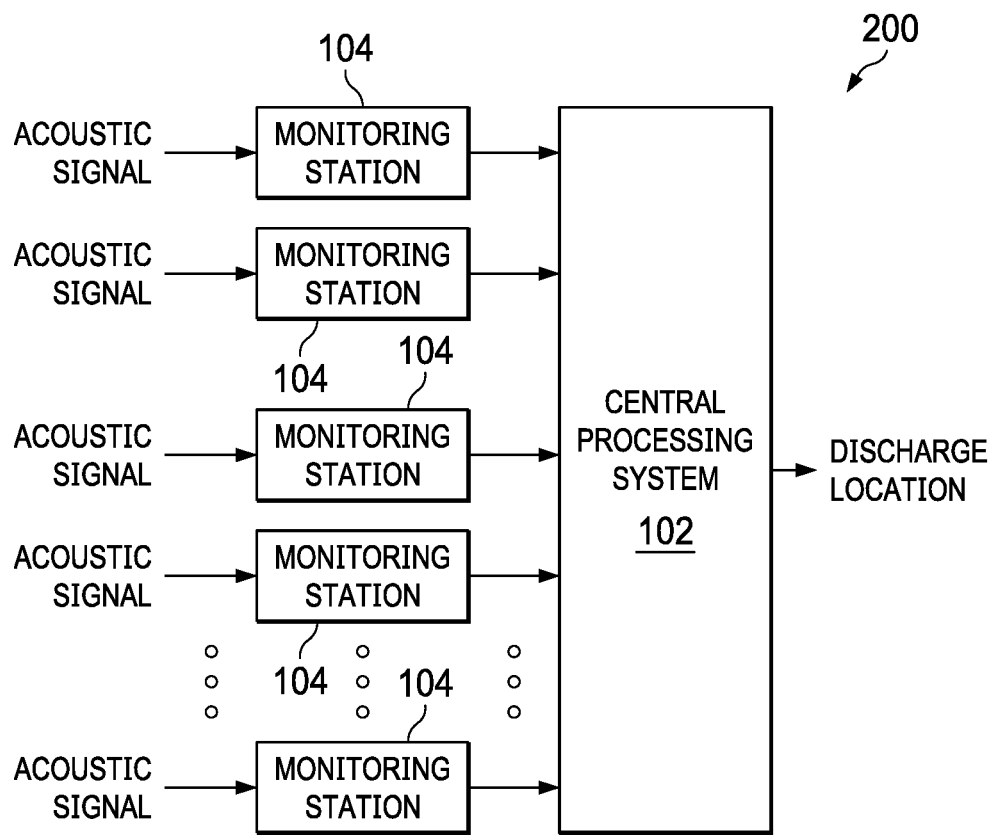
FIG. 2 shows a block diagram of a firearm discharge source location system in accordance with various embodiments.

FIG. 2 shows a block diagram of a firearm discharge source location system 200 in accordance with various embodiments. The system 200 includes a plurality of monitoring stations 104 and a central processing system 102. The monitoring stations 104 are communicatively coupled to the central processing system 102 via a wired or wireless communication network. For example, the monitoring stations 104 may communicate with the central processing system 102 via a wide area wireless network, such as a cellular communication network, a metropolitan area network, the Internet, or any other communication network or combination of communication networks. The monitoring stations 104 detect firearm discharge and communicate timing information relevant to the firearm discharge to the central processing system 102. The central processing system 102 simulates propagation of acoustic signal in the geographic environment in which the monitoring stations 104 operate to identify the location at which the firearm discharge originated.

Figure 3:
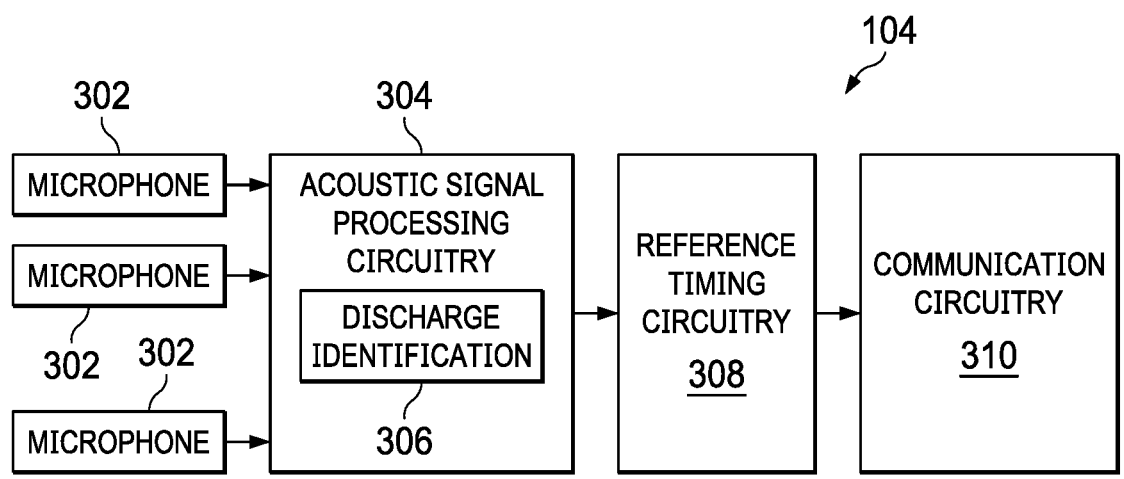
FIG. 3 shows a block diagram of a monitoring station of a firearm discharge source location system in accordance with various embodiments.

FIG. 3 shows a block diagram of a monitoring station 104 of a firearm discharge source location system 200 in accordance with various embodiments. The monitoring station 104 includes one or more microphones 302, acoustic signal processing circuitry 304, reference timing circuitry 308, and communication circuitry 310. Some embodiments of the monitoring station 104 include two, three, or four microphones 302. The microphones 302 are acoustic sensors that convert acoustic signals to electrical signals. The microphones 302 may be condenser microphones, dynamic microphones, ribbon microphones, piezoelectric microphones, MEMS microphones, or any other type of acoustic transducer for converting acoustic energy (e.g., pressure waves) into electrical signals. The positions of and/or distances between the microphones 302 may be fixed. Electrical signals output by the microphones 302 are provided to the acoustic signal processing circuitry 304. In some embodiments, the microphones 302 are arranged in a one-dimensional array (e.g., in a single row horizontal to the ground) to allow determination of direction to a firearm discharge. In some embodiments, the microphones are arranged in a two-dimensional array (e.g., one or more microphones 302 are vertically offset from the other microphones 302) to allow determination of elevation of a firearm discharge.

The acoustic signal processing circuitry 304 includes discharge identification circuitry 306 that monitors the electrical signals received from each of the microphones 302 for firearm discharge signatures. The acoustic signal processing circuitry 304 may include one or more analog-to-digital converters (ADC) to digitize the electrical signals received from the microphones 302. The discharge identification circuitry 306 may monitor the amplitude, rate of amplitude change, frequency content, etc. of the digitized acoustic signal to determine whether a firearm discharge signature is present in the digitized acoustic signal. For example, if the amplitude of the digitized acoustic signal increases at predetermined rate to a maximum value that exceeds a predetermined threshold, then the discharge identification circuitry 306 may identify the portion of the digitized acoustic signal increasing in amplitude at at least the predetermined rate and/or exceeding the predetermined amplitude threshold as a firearm discharge.

The acoustic signal processing circuitry 304 may include analog circuitry, such as amplifiers and filters to condition the electrical signal received from the microphones 302 for digitization, an ADC to digitize the microphone output signals, and processing circuitry to analyze the digitized microphone output. The processing circuitry may include a processor, such as a digital signal processor, a general purpose microprocessor, a microcontroller, etc. to analyze the digitized microphone output, and identify therein a firearm discharge. Instructions executed by the processor may be stored in a computer-readable medium that includes volatile storage such as random access memory, nonvolatile storage (e.g., a hard drive, an optical storage device (e.g., CD or DVD), FLASH storage, read-only-memory), or combinations thereof.

The reference timing circuitry 308 provides a globally synchronized clock for determining the time at which a firearm discharge is detected. The reference timing circuitry 308 includes clock circuitry that is synchronized to timing signals received from a reference timing source. The reference timing source may be timing source to which all monitoring stations 104 of a system 200 have access. For example, the reference timing circuitry 308 may include a satellite receiver, such as a global positioning system (GPS) receiver, a global navigation satellite system (GLONASS) receiver, or other satellite navigation or timing signal receiver to provide access to a global reference timing source. The clock circuitry of the reference timing circuitry 308 may be synchronized to timing signals received from the satellite system. In some embodiments, the reference timing circuitry 308 may include a receiver for receiving terrestrial rather than satellite generated reference timing signals, where a terrestrial timing source serves as a global reference timing source.

When the acoustic signal processing circuitry 304 identifies a firearm discharge in the signals generated by a given microphone 302, the time of identification may be recorded as the current time value provided by the reference timing circuitry 308. That is, a time value corresponding to the time of firearm discharge identification is recorded, where the time value is provided by a clock that is synchronized across all monitoring stations 104 of the system 200. Differences in sound travel time (e.g., differences in sound travel distance) from the source location of the firearm discharge to the different microphones of a monitoring station 104 result in different discharge identification time values for each microphone 302.

The communication circuitry 310 includes circuits that provide wired or wireless communication between the monitoring station 104 and the central processing system 102. For example, the communication circuitry 310 may include network adapter circuitry that allows the monitoring station 104 to communicate with the central processing system 102 via a wide area wireless network, such as a cellular communication network, a metropolitan area network, the Internet, or any other communication network or combination of communication networks. Discharge time values assigned to a discharge identification for each of the microphones 302 are transmitted to the central processing system 102 via the communication circuitry 310. Additional information, such as geographic location of the monitoring station 104 may also be communicated to the central processor 102 in conjunction with or separate from the discharge time values.

Figure 4:
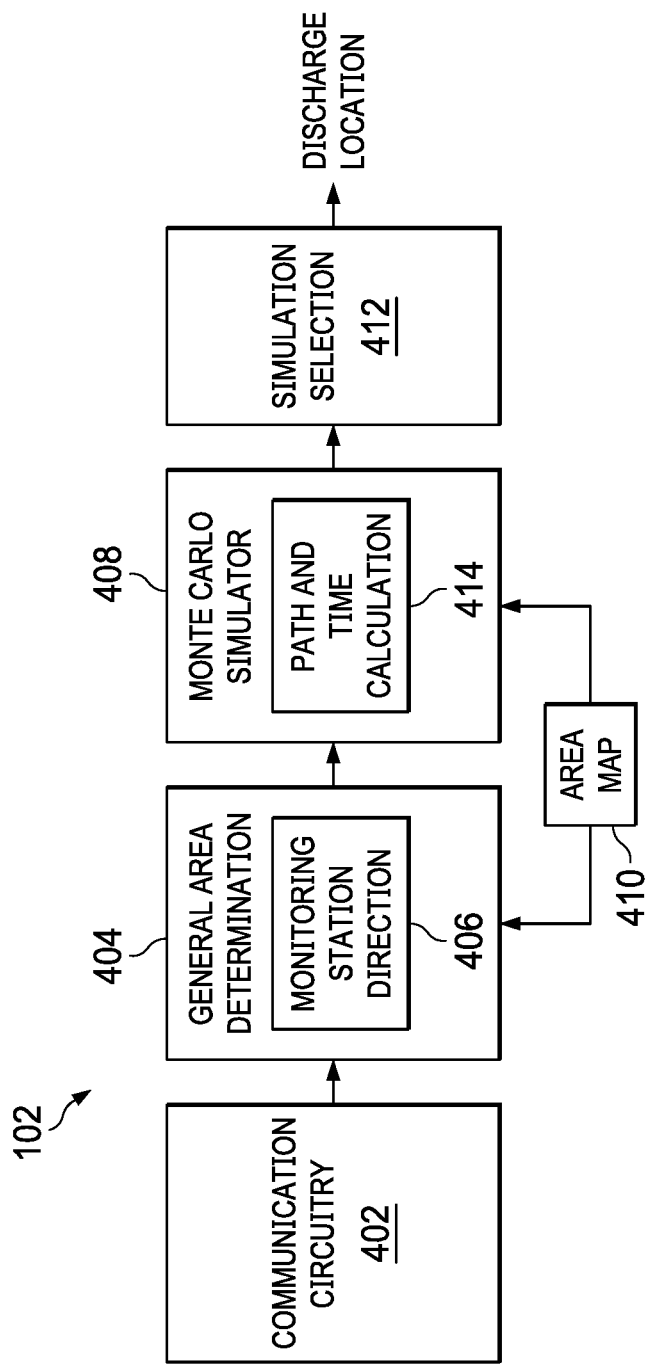
FIG. 4 shows a block diagram of a central processing system of a firearm discharge source location system in accordance with various embodiments.

FIG. 4 shows a block diagram of a central processing system 102 of a firearm discharge source location system in accordance with various embodiments. The central processing system 102 includes communication circuitry 402, general area determination sub-system 404, Monte Carlo simulator 408, area map 410, and simulation selection 412. The communication circuitry 402 includes circuits that provide wired or wireless communication between the monitoring station 104 and the central processing system 102. For example, the communication circuitry 310 may include network adapter circuitry that allows the central processing system 102 to communicate with the monitoring stations 104 via a wide area wireless network, such as a cellular communication network, a metropolitan area network, the Internet, Ethernet, or any other communication network or combination of communication networks. The central processing system 102 receives the discharge time values produced by the monitoring stations 104 via the communication circuitry 402.

The central processing system 102 has access to information specifying the geographic location of each of the monitoring stations 104. For example, the geographic location of each of the monitoring stations 104 may be stored in a database or other storage structure coupled to and/or accessible to the central processing system 102. In some embodiments, the monitoring station 104 may transmit geographic location information to the central processing system 102 in conjunction with the discharge time values or separate from the discharge time values.

The general area determination sub-system 404 determines a broad geographic area within which the firearm discharge corresponding the received discharge time values may have occurred. The general area determination sub-system 404 includes monitoring station direction logic 406 that estimates, for each monitoring station 104 providing discharge time values, a direction from the monitoring station 104 to the discharge location. The monitoring station direction logic 406 may determine the direction for each monitoring station 104 based on the discharge time values provided for each microphone 302 of the monitoring station 104 and the estimated speed of sound in the area of the monitoring stations 104. For example, differences in discharge time value across the microphones 302 of a monitoring station 104 are indicative of an angle of propagation of the acoustic energy of the firearm discharge to the microphones 302 at a given speed of sound. Accordingly, given the relative locations of the microphones 302 of a monitoring station 104 and an estimated speed of sound, the monitoring station direction logic 406 can determine an angle of acoustic energy propagation to the monitoring station 104.

Some embodiments of the monitoring station direction logic 406 may determine a direction of acoustic propagation to a monitoring station 104 based on the discharge time value received from the monitoring station 104, and direction information computed for other monitoring stations 104. For example, direction of propagation to a monitoring station 104 may be ambiguous if there is no difference in time values for the multiple microphones 302 of the monitoring station 104. In such a case the angular direction values computed for other monitoring stations 104 may be used to resolve the ambiguity.

Because the speed of sound can vary under different environmental conditions, the general area determination sub-system 404 may estimate the speed of sound in the area of the monitoring stations 104 based on environmental conditions at the time of the firearm discharge. Embodiments may determine a speed of sound value based on environmental factors such as: humidity, temperature, wind speed, wind direction, atmospheric pressure, and/or other parameters. In various embodiments, the system 200 may include sensors to measure environmental parameters used to determine the speed of sound, or may access published environmental parameter information for the area, e.g., environmental information published on the Internet.

Given sound propagation direction information for multiple monitoring stations 104, the general area determination sub-system 404 determines a broad geographic area within which the firearm discharge may have originated. The general area may be determined by any of a variety of methods. In some embodiments, the general area may be identified as a predetermined area about a point of intersection of vectors extending from each monitoring station 104 in a direction opposite to the direction of sound propagation to the monitoring station 104. In some embodiments, the general area may be identified as an area extending between monitoring stations 104 that detect the firearm discharge from different directions. FIG. 1 shows an example of a general area 114 selected by the general area determination sub-system 404 as corresponding to the firearm discharge 112. Some embodiments may also employ signal amplitude information in determining the general area of firearm discharge origination. For example, the monitoring stations 104 may communicate discharge amplitude and timing information to the central processing system 102. The central processing system 102 may process the timing information to determine direction to the discharge, and apply the amplitude information as an indication of proximity to the discharge (e.g., higher amplitudes are closer to the discharge location and lower amplitudes are farther from the discharge location).

The general area determination sub-system 404 provides information defining the general area of the firearm discharge to the Monte Carlo simulator 408. The information may specify geographic coordinates of the general area. The central processing system 102 includes an area map 410. The area map 410 defines the locations of structures, such as buildings, and open areas, such as streets, parking lots, vacant areas, etc. in the vicinity of the monitoring stations 104. The area map 410 may be derived from a satellite photograph, aerial photograph, or published relief map of the area from which three-dimensional measurements can be extracted. In some embodiments, the general area determination sub-system 404 may identify a portion of the area map 410 corresponding to the general area of the firearm discharge and the information provided to the Monte Carlo simulator 408 may be provided as the portion of the area map 410. In some embodiments, Monte Carlo simulator 408 may identify a portion of the area map 410 corresponding to the general area of the firearm discharge based on the geographic information received from the general area determination sub-system 404.

Given the general area of the firearm discharge with respect to the area map 410, the Monte Carlo simulator 408 randomly selects locations within the general area as potential source locations for the firearm discharge. In some embodiments, the Monte Carlo simulator 408 may select only locations that are in open areas (not internal to structures such as buildings) of the area map 410 as potential source locations for the firearm discharge. The Monte Carlo simulator 410 may select any number (e.g., thousands) of locations within the general area as potential source locations for the firearm discharge. In embodiments in which elevation information is extracted from the time information received from the monitoring stations 104, the Monte Carlo simulator 410 may also select potential source locations at a variety of elevations for path timing analysis.

The Monte Carlo simulator 408 includes path and time calculation logic 414 that determines the path and time of sound propagation in the area map 410. For each randomly selected potential source location, the path and time calculation logic 414 determines the shortest path for sound travel from the potential source location to each of the monitoring stations 104 that provided a time value for the firearm discharge. In some embodiments, the path and time calculation logic 414 may express the portion of the area map 410 corresponding to the general area of the firearm discharge as a graph. For example, vertices may be street intersections and monitoring stations 104, and paths between vertices may be along streets or other open areas between vertices, with path distances determined based on geographic dimensions of the area map 410. Embodiments may apply Dijkstra's algorithm or any other path length determination algorithm to find the shortest path between each potential source location and each monitoring station 104. That is, given, for example, potential source locations A, B, and C, and monitoring stations D, E, and F, the path and time calculation logic 414 determines: 1) the shortest distance in the area map 410 from location A to monitoring station D, from location A to monitoring station E, and from location A to monitoring station F; 2) the shortest distance in the area map 410 from location B to monitoring station D, from location B to monitoring station E, and from location B to monitoring station F; and 3) the shortest distance in the area map 410 from location C to monitoring station D, from location C to monitoring station E, and from location C to monitoring station F.

Having computed the distance values between the potential source locations and the monitoring stations 104, the path and time calculation logic 414 determines time of sound propagation for each distance value as:

$$PropTime = \frac{Distance}{SpeedOfSound}.$$

As explained above, speed of sound may be determined based on environmental factors in the general area at the time of the firearm discharge. In some embodiments, the path and time calculation logic 414 may determine a different speed of sound value for different portions of the path between the potential source location and the monitoring station. For example, wind speed may vary significantly in different areas of an urban environment, and produce a corresponding difference in speed of sound. Thus, speed of sound may differ across the segments of a path from a potential source location to a monitoring station, and the path and time calculation logic 414 can account for such differences by computing a propagation time value for each segment (at a suitable speed of sound value), and summing the propagation times of all segments in a path.

The simulation selection unit 412 determines which of the randomly selected potential source locations for the firearm discharge best represents the actual source location that produced the discharge time values received from the monitoring stations 104. The simulation selection unit 412 compares differences in propagation time values for each potential source location to differences in the discharge time values received from the monitoring stations 104 to select one of the potential source locations as best representing the actual source location. For example, the simulation selection unit 412: 1) identifies a minimum discharge time value in the discharge time values received from the monitoring stations 104; 2) computes a time difference between the minimum discharge time value and a selected discharge time value (e.g., a time value corresponding to a selected microphone 302 of each other monitoring station 104; 3) for each potential source location, determines differences between the propagation time values to each monitoring station 104 corresponding to the time differences computed from the discharge values received from the monitoring stations 104; and 4) compares the time difference values computed for the discharge time values received from the monitoring stations 104 to the time difference values computed for each potential source location.

To further elaborate on the example, given monitoring stations D, E, and F introduced above, the simulation selection unit 412: 1) compares the discharge time values received from the monitoring stations D, E, and F and identifies a discharge time value from monitoring station D as the minimum time value; 2) computes a difference time value for each of the monitoring stations E and F by subtracting the minimum time value from a discharge time value received from each of monitoring stations E and F; 3) for each potential source location, computes a difference time value for each of the monitoring stations E and F by subtracting the propagation time value for monitoring station D from the propagation time value for each of monitoring stations E and F; 4) compares the time difference values for monitoring station E computed in steps 2) and 3) and compares the time difference values for monitoring station F computed in steps 2) and 3).

The simulation selection unit 412 selects the potential source location for which the time difference values computed for the potential source location are closest to the time difference values computed for the discharge time values received from the monitoring stations 104 as the source location of the firearm discharge. In some embodiments, the simulation selection unit 412 may select the one of the potential source locations that best corresponds to the source location of the firearm discharge as the potential source location for which a composite difference value (e.g., the Euclidean distance) between the time difference values computed for the potential source location and the time difference values computed for the discharge time values received from the monitoring stations 104 is smallest.

The central processing system 102 may transmit the potential source location selected as best corresponding to the actual source location of the firearm discharge to an external system. For example, the central processing system 102 may transmit the selected source location to the relevant authorities (e.g., police) to facilitate further investigation.

Figure 5:
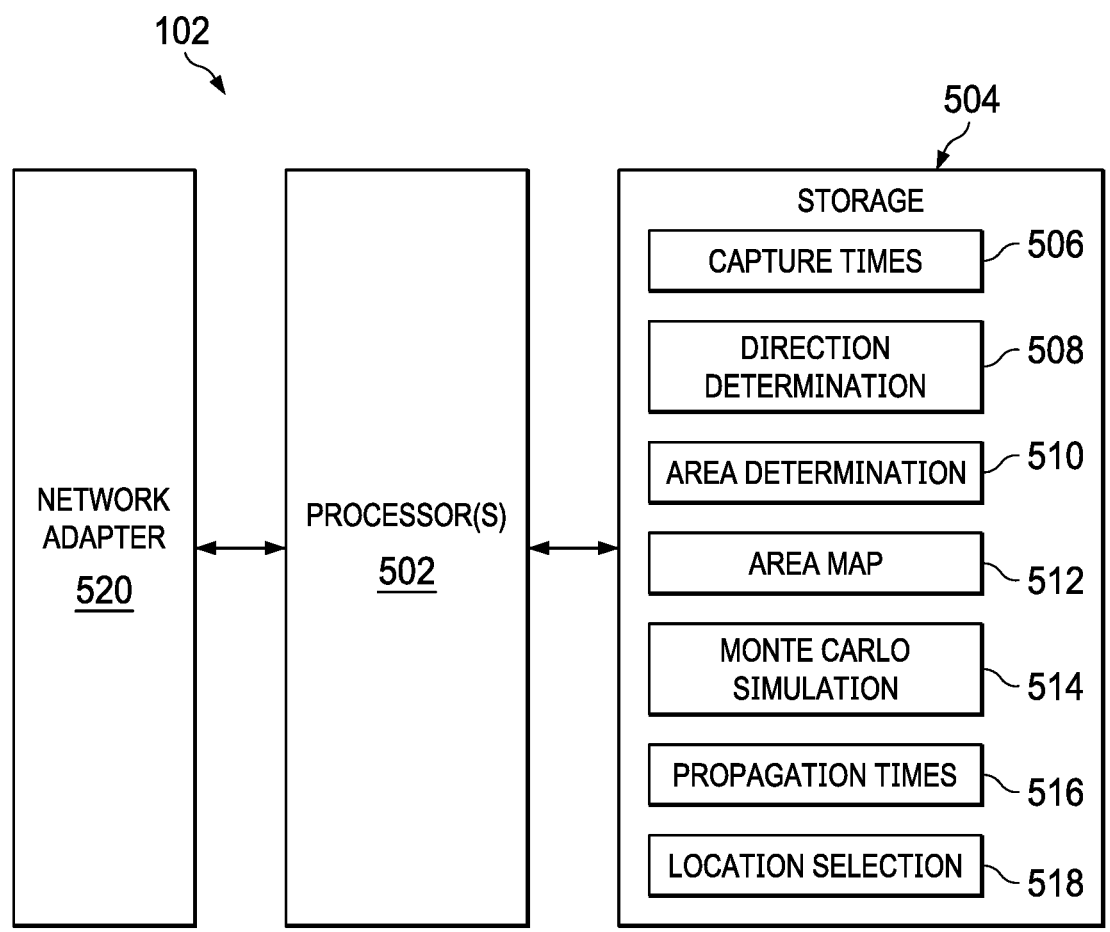
FIG. 5 shows a block diagram of a central processing system of a firearm discharge source location system in accordance with various embodiments.

FIG. 5 shows a block diagram of the central processing system 102 in accordance with various embodiments. The central processing system 102 includes one or more processors 502, storage 504, and a network adapter 520. The central processing system 102 may include addition components that are not shown in FIG. 5. For example, the central processing system 102 may include a power supply, user interface circuitry, such as video adapters and user input devices, and other components. Some embodiments of the central processing system 102 may be implemented using one or more computers such as, desktop computers, server computers, rackmount computers, laptop computers, or other computing devices.

The processor(s) 502 may be any suitable processor capable of executing instructions. For example, in various embodiments, processor(s) 502 may be general-purpose or embedded microprocessors implementing any of a variety of instruction set architectures (ISAs), such as the x86, PowerPC, SPARC, MIPS, or ARM ISAs, or any other suitable ISA. In multiprocessor systems, each of processors 502 may commonly, but not necessarily, implement the same ISA. Similarly, in a distributed implementation of the central processing system 102, each of the processors 502 may implement the same ISA, or different ISAs.

The storage 504 may include a non-transitory, computer-readable storage medium configured to store program instructions and/or data accessible by processor(s) 502. The storage 504 may be implemented using any suitable memory technology, such as static random access memory (SRAM), synchronous dynamic RAM (SDRAM), nonvolatile/Flash-type memory, magnetic media, optical media, or any other type of memory or combinations thereof. Program instructions and data implementing the functionality disclosed herein are stored within storage 504. Discharge times 506 include the firearm discharge time values received from the monitoring stations 104. Area map 512 is an embodiment of the area map 410 that provides to scale geographic information regarding an urban area in which the firearm discharge source location system 200 is operating. The direction determination instructions 508 include instructions that are executed by the processor(s) 502 to determine the direction from which acoustic energy associated with a firearm discharge propagated to each monitoring station 104. The area determination instructions include instructions that are executed by the processor(s) 502 to identify a general area within which a firearm discharge originated based on the direction information generated by execution of the direction determination instructions 508.

The Monte Carlo simulation instructions 514 include instructions that are executed by the processor(s) 502 to randomly select potential firearm discharge locations in the general area identified by execution of the area determination instructions 510. The Monte Carlo simulation instructions 514 also include instructions that are executed by the processor(s) 502 to determine the minimum distance and acoustic travel time between each potential firearm discharge location and each monitoring station 104. The propagation times 516 include the acoustic travel times generated by execution of the Monte Carlo simulation 514. The location selection instructions 518 include instructions that are executed by the processor(s) 502 to determine which of the potential firearm discharge locations produced acoustic travel times, as recorded in the propagation times 516, that best correspond to the discharge time values received from the monitoring stations 104 (as determined based on differences between the travel times and the received discharge time values).

Figure 6:
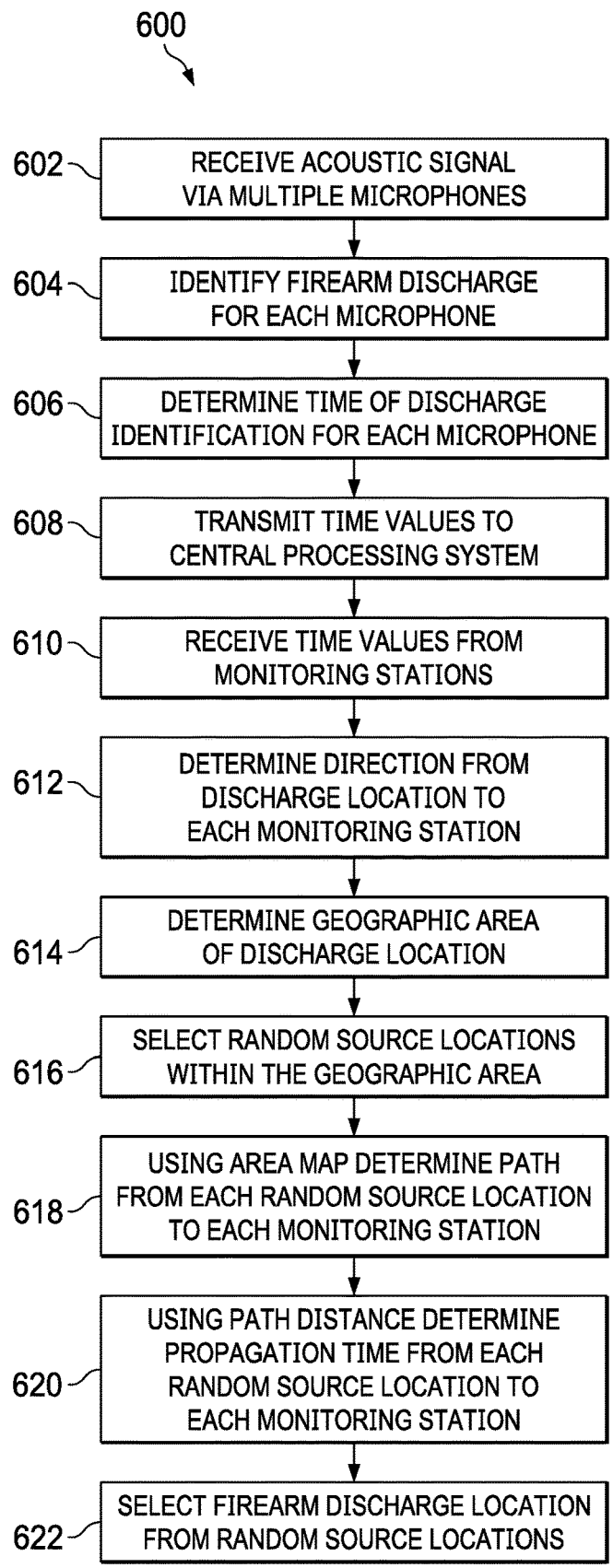
FIG. 6 shows a flow diagram for a method for determining the source location of a firearm discharge in accordance with various embodiments.

FIG. 6 shows a flow diagram for a method 600 for determining the source location of a firearm discharge in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be performed by the firearm discharge source location system 200.

In block 602, multiple monitoring stations 104 are disposed in an environment that includes a large number of acoustic reflectors and obstructions, such as an urban environment. Each monitoring station 104 includes multiple microphones 302. The microphones 302 are receiving acoustic signals and converting the acoustic signals to electrical signals.

In block 604, the electrical signals are being processed by the acoustic signal processing circuitry 304. The acoustic signal processing circuitry 304 identifies signals representative of a firearm discharge in the electrical signals provided by each of the microphones 302. The acoustic signal processing circuitry 304 may monitor the amplitude, rate of amplitude change, frequency content, etc. of the signal to identify the presence of a firearm discharge. For example, if the amplitude of the digitized acoustic signal increases at predetermined rate to a maximum value that exceeds a predetermined threshold, then the acoustic signal processing circuitry 304 may identify the signal as representative of a firearm discharge.

In block 606, a time value is assigned to each firearm discharge identified by the acoustic signal processing circuitry 304. The time value may be derived from clock circuitry that is synchronized to an external timing reference, such as GPS. Thus, time values generated by all of the monitoring stations 104 are synchronized to a common time base.

In block 608, the monitoring stations 104 transmit the discharge time values assigned to the firearm discharge detected at each microphone 302 to the central processing system 102. The monitoring stations 104 may also transmit geographic location information and/or other information to the central processing system 102. The monitoring stations 104 may transmit the discharge time values via any combination of wired and wireless networks through which the monitoring stations 104 and the central processing system 102 communicate.

In block 610, the central processing system 102, receives the discharge time values transmitted by the monitoring stations 104.

In block 612, the central processing system 102 processes the discharge time values received from each monitoring station 104 to determine the direction from which acoustic energy of the firearm discharge traveled to the monitoring station 104. The relative locations of the microphones 302 of a monitoring station 104 are known to the central processing system 102, and given a speed of sound value for the area of the monitoring stations 104, the difference in detection time across the microphones 302 is indicative of the angle at which the acoustic energy was incident on the microphones 302, and the direction from which the acoustic energy traveled to the monitoring station 104.

In block 614, the central processing system 102 determines a general geographic area in which the firearm discharge originated. The general geographic area does not indicate a precise location of discharge origination, but defines a larger geographic area that encompasses the location of discharge origination. The central processing system 102 may identify the general area using any of a variety of methods. In some embodiments, the general area may be identified as a predetermined spatial area about a point of intersection of vectors extending from each monitoring station 104 in a direction opposite to the direction of sound propagation to the monitoring station 104 determined in block 612. In some embodiments, the general area may be identified as an area extending between monitoring stations 104 that detect the firearm discharge from different directions.

In block 616, the central processing system 102 selects at random potential source locations for the firearm discharge. The potential source locations are within the general geographic area identified in block 616. Any number of potential source locations may be selected. In some embodiments, the potential source locations are selected to be outside of structures identified in the area map 410. That is, the potential source locations may be selected to be in open areas as identified in the area map 410.

In block 618, the central processing system 102 determines the shortest path from each potential source location to each monitoring station 104. The area map 410 determines the paths available for acoustic propagation. For example, sound may propagate along streets and open areas, but not through structures such as buildings. In some embodiments, the central processing system 102 may express the portion of the area map 410 corresponding to the general area of the firearm discharge identified in block 614 as a graph. For example, vertices may be street intersections and monitoring stations 104 and paths between vertices may be along streets or other open areas between vertices, with path distances determined based on geographic dimensions of the area map 410. Embodiments may apply Dijkstra's algorithm or another path length determination method to find the shortest path between each potential source location and each monitoring station 104.

In block 620, the central processing system 102 determines the propagation time from each potential source location to each monitoring station 104 as a function of the distance determined in block 618 for each source location-monitoring station 104 combination, and the speed of sound in the general area identified in block 614. Because the speed of sound can vary under different environmental conditions, the central processing system 102 may estimate the speed of sound based on environmental conditions at the time of the firearm discharge. Embodiments may determine a speed of sound value based on environmental factors such as: humidity, temperature, wind speed, wind direction, and/or other parameters.

In block 622, for each potential source location the central processing system 102 determines which of the randomly selected potential source locations for the firearm discharge best represents the actual source location that produced the discharge time values received from the monitoring stations 104. The central processing system 102 compares differences in propagation time values for each potential source location to differences in the discharge time values received from the monitoring stations 104 to select one of the potential source locations as best representing the actual source location. For example, the central processing system 102: 1) computes differences in discharge time values received from the monitoring stations 104; 2) for each potential source location, determines differences in the propagation time values to difference monitoring stations; 3) compares the time difference values computed for the discharge time values received from the monitoring stations 104 to the time difference values computed for each potential source location; and 4) selects the potential source location for which the time difference values computed for the potential source location are closest to the time difference values computed for the discharge time values received from the monitoring stations 104 as the source location of the firearm discharge. Closeness may be determined by a composite difference value, such as Euclidean distance.

The location selected as the location of firearm discharge origination may be provided to an external system as a trigger to further action. For example, the central processing system 102 may transmit the selected source location to the relevant authorities (e.g., police) to facilitate trigger investigation.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system for determining a source location of a firearm discharge, comprising:
   a plurality of monitoring stations, each of the monitoring stations comprising:
      a plurality of acoustic sensors;
      processing circuitry coupled to the acoustic sensors, the processing circuitry configured to:
         monitor output signal of the acoustic sensors; and
         identify in the output signal of each of the acoustic signals a signature indicative of a firearm discharge;
      timing circuitry configured to:
         generate a clock signal that is synchronized to an external timing reference; and
         apply the clock signal to determine a time value of identification of the signature indicative of the firearm discharge for each of the acoustic sensors; and
      communication circuitry configured to transmit the time value for each of the acoustic sensors;
   a central processing system communicatively coupled to the monitoring stations, the central processing system comprising:
      communication circuitry configured to receive the time value for each of the acoustic sensors of each of the monitoring stations; and
      processing circuitry configured to:
         determine, based on the time values of the acoustic sensors of the monitoring stations, a geographic area that includes the source location of the firearm discharge;
         determine a time of acoustic propagation from each of a plurality of randomly selected locations within the geographic area to each of the monitoring stations; and
         identify the source location of the firearm discharge as one of the selected locations within the geographic area for which a difference in time of acoustic propagation to each of the monitoring stations is closest to a difference of the time values received from the monitoring stations.

2. The system of claim 1, wherein the processing circuitry is configured to determine the time of acoustic propagation based on a geographic map that includes the geographic area and each of the monitoring stations.

3. The system of claim 2, wherein the processing circuitry is configured to determine a shortest distance from each of the randomly selected locations to each of the monitoring stations based on unobstructed paths for acoustic propagation represented in the geographic map.

4. The system of claim 3, wherein the processing circuitry is configured to determine speed sound based on environmental conditions in the geographic area at one of the values of time.

5. The system of claim 4, wherein the processing circuitry is configured to determine the time of acoustic propagation from each of the plurality of randomly selected locations within the geographic area to each of the monitoring stations as a function of the determined speed of sound and the determined shortest distance.

6. The system of claim 1, wherein the processing circuitry is configured to:
   determine for each of the selected locations a composite difference value between the difference in time values received from each of the monitoring stations and the difference in times of acoustic propagation to each of the monitoring stations; and
   select the source location of the firearm discharge as a smallest of the composite difference values.

7. The system of claim 1, wherein the timing circuitry comprises a satellite receiver configured to receive a timing signal transmitted by a satellite.

8. The system of claim 1, wherein the processing circuitry is configured to:
   determine, for each of the monitoring stations, based on the time value of each of the acoustic sensors of the monitoring station, a direction from the monitoring station to a potential source location of the firearm discharge; and
   determine the geographic area that includes the source location of the firearm discharge based on the direction from the monitoring station to the potential source location of the firearm discharge.

9. A method for determining a source location of a firearm discharge, comprising:

identifying, by each of a plurality of remote monitoring stations, a signature indicative of the firearm discharge in an output signal of each of a plurality of acoustic sensors;

determining, by each of the plurality of remote monitoring stations, a time value of a reference timing system at which identification of the signature indicative of the firearm discharge occurred for each of the acoustic sensors;

communicating, by each of the plurality of remote monitoring stations, the time values to a central processor;

determining, by the central processor, based on the time value of each of the acoustic sensors of the monitoring stations, a geographic area that includes the source location of the firearm discharge;

determining, by the central processor, a time of acoustic propagation from each of a plurality of randomly selected locations within the geographic area to each of the monitoring stations; and identifying, by the central processor, the source location of the firearm discharge as one of the selected locations within the geographic area for which a difference in the time of acoustic propagation to each of the monitoring stations is closest to a difference in the time values received from the monitoring stations.

10. The method of claim 9, further comprising determining, by the central processor, the time of acoustic propagation based on a geographic map that includes the geographic area and each of the monitoring stations.

11. The method of claim 10, further comprising determining, by the central processor, a shortest distance from each of the randomly selected locations to each of the monitoring stations based on unobstructed paths for acoustic propagation represented in the geographic map.

12. The method of claim 11, further comprising determining, by the central processor, speed sound based on environmental conditions in the geographic area at one of the values of time.

13. The method of claim 12, further comprising determining, by the central processor, the time of acoustic propagation from each of the plurality of randomly selected locations within the geographic area to each of the monitoring stations as a function of the determined speed of sound and the determined shortest distance.

14. The method of claim 9, further comprising:
determining, by the central processor, for each of the randomly selected locations a composite difference value between a difference in time values received from each of the monitoring stations and a difference in the times of acoustic propagation to each of the monitoring stations; and
selecting, by the central processor, the source location of the firearm discharge as a smallest of the composite difference values.

15. The method of claim 11, further comprising:
determining, by the central processor, for each of the monitoring stations, based on the time value of each of the acoustic sensors of the monitoring station, a direction from the monitoring station to a potential source location of the firearm discharge; and
determining, by the central processor, the geographic area that includes the source location of the firearm discharge based on the direction from the monitoring station to the potential source location of the firearm discharge.

16. A processing system for determining a source location of a firearm discharge, comprising:
communication circuitry configured to:
communicate with a plurality of monitoring stations, wherein each of the monitoring stations comprises a plurality of acoustic sensors; and
receive a time value for each of the acoustic sensors of each of the monitoring stations, wherein the time value represents a time at which a firearm discharge is detected via the acoustic sensor; and
processing circuitry configured to:
determine, for each of the monitoring stations, based on the time value of each of the acoustic sensors of monitoring station, a direction from the monitoring station to a potential source location of the firearm discharge; and
select a geographic area that includes the source location of the firearm discharge based on the direction from the monitoring station to the potential source location of the firearm discharge;
determine a time of acoustic propagation from each of a plurality of randomly selected locations within the geographic area to each of the monitoring stations;
determine for each of the randomly selected locations a composite difference value representing a difference of: a difference in the time values received from each of the monitoring stations and a difference in the time of acoustic propagation to each of the monitoring stations; and
identify the source location of the firearm discharge as a smallest of the composite difference values.

17. The processing system of claim 16, wherein the processing circuitry is configured to determine the time of acoustic propagation based on a geographic map that includes the geographic area and each of the monitoring stations.

18. The processing system of claim 17, wherein the processing circuitry is configured to determine a shortest distance from each of the randomly selected locations to each of the monitoring stations based on unobstructed paths for acoustic propagation represented in the geographic map.

19. The processing system of claim 18, wherein the processing circuitry is configured to determine speed sound based on environmental conditions in the geographic area at one of the values of time.

20. The processing system of claim 19, wherein the processing circuitry is configured to determine the time of acoustic propagation from each of the plurality of randomly selected locations within the geographic area to each of the monitoring stations as a function of the determined speed of sound and the determined shortest distance.

* * * * *